United States Patent
Kodaira et al.

(10) Patent No.: US 11,661,529 B2
(45) Date of Patent: May 30, 2023

(54) HEAT DISSIPATING PAINT COMPOSITION AND METHOD FOR FORMING HEAT DISSIPATING COATING

(71) Applicants: HONDA MOTOR CO., LTD., Tokyo (JP); DAI NIPPON TORYO CO., LTD., Osaka (JP)

(72) Inventors: Ryosuke Kodaira, Wako (JP); Kazutaka Yokoyama, Wako (JP); Takanori Kobayashi, Wako (JP); Megumi Sakai, Tochigi (JP); Toshiyuki Mizuno, Tochigi (JP); Ryo Nakatani, Aichi (JP); Takahiro Inoue, Aichi (JP)

(73) Assignees: HONDA MOTOR CO., LTD., Tokyo (JP); DAI NIPPON TORYO CO., LTD, Osaka (JP)

(*) Notice: Subject to any disclaimer, the term of this patent is extended or adjusted under 35 U.S.C. 154(b) by 422 days.

(21) Appl. No.: 16/845,569

(22) Filed: Apr. 10, 2020

(65) Prior Publication Data
US 2020/0325356 A1 Oct. 15, 2020

(30) Foreign Application Priority Data
Apr. 12, 2019 (JP) .................. JP2019-076433

(51) Int. Cl.
| | | |
|---|---|---|
| C09D 163/00 | (2006.01) | |
| C09D 5/32 | (2006.01) | |
| C09D 171/02 | (2006.01) | |
| B05D 3/02 | (2006.01) | |
| B05D 7/14 | (2006.01) | |

(52) U.S. Cl.
CPC .......... *C09D 163/00* (2013.01); *B05D 3/0254* (2013.01); *B05D 7/14* (2013.01); *C09D 5/32* (2013.01); *C09D 171/02* (2013.01); *B05D 2504/00* (2013.01)

(58) Field of Classification Search
CPC .... B05D 2504/00; B05D 3/0254; B05D 7/14; C08G 59/28; C09D 163/00; C09D 171/02; C09D 5/32
See application file for complete search history.

(56) References Cited

U.S. PATENT DOCUMENTS

| | | | |
|---|---|---|---|
| 2016/0168416 A1* | 6/2016 | Minnikanti | C08G 59/066 |
| | | | 523/435 |
| 2018/0106562 A1 | 4/2018 | Hwang et al. | |
| 2020/0154608 A1* | 5/2020 | Kim | H05K 7/20427 |

FOREIGN PATENT DOCUMENTS

| | | |
|---|---|---|
| CN | 101815772 A | 8/2010 |
| CN | 107429107 A | 12/2017 |
| JP | 2006281514 A | 10/2006 |
| JP | 2015193598 A | 11/2015 |

(Continued)

OTHER PUBLICATIONS

China First Office Action for CN Patent Application 202010284554.4 dated May 20, 2021; 13 pp.

*Primary Examiner* — Alexander M Weddle (74) *Attorney, Agent, or Firm* — Armstrong Teasdale LLP (57) ABSTRACT

A heat dissipating paint composition for forming a heat dissipating coating is disclosed. The heat dissipating paint includes a prepolymer and a curing agent. The prepolymer includes a main chain containing an epoxy resin and a linear side chain bonded to the main chain and having 5 to 101 carbon atoms.

6 Claims, 3 Drawing Sheets

(56) References Cited

FOREIGN PATENT DOCUMENTS

| KR | 20180013842 A | | 2/2018 | | |
|---|---|---|---|---|---|
| WO | 2008078956 A9 | | 5/2009 | | |
| WO | WO-2017204565 A1 | * | 11/2017 | ........... | C09D 163/00 |

* cited by examiner

HEAT DISSIPATING PAINT COMPOSITION AND METHOD FOR FORMING HEAT DISSIPATING COATING

TECHNICAL FIELD

The present invention relates to a heat dissipating paint composition and a method for forming a heat dissipating coating containing the heat dissipating paint composition.

BACKGROUND ART

It is known to form a heat dissipating coating on the surface of a device to promote the heat dissipation of the device. The heat dissipating coating generally includes a base material made of a resin such as an acrylic resin, and a heat dissipating filler made of inorganic particles such as carbon black retained or mixed in the base material. See JP2006-281514A, for instance.

The conventional heat dissipating coating has a heat dissipating filler as an essential component. Therefore, it is necessary to properly select a heat dissipating filler material suitable for the base material, to prepare the heat dissipating filler, and to disperse the heat dissipating filler evenly in the base material. The heat dissipating fillers may cause a deterioration of the base material. If the mixing of the heat dissipating filler can be omitted, the production of the heat dissipating coating can be greatly facilitated.

SUMMARY OF THE INVENTION

In view of such a problem of the prior art, a primary object of the present invention is to provide a heat dissipating paint composition that does not require a heat dissipating filler, and a method for forming a heat dissipating coating containing the heat dissipating paint composition.

To achieve such an object, the present invention provides a heat dissipating paint composition for forming a heat dissipating coating, comprising a prepolymer including a main chain containing an epoxy resin and a linear side chain bonded to the main chain and having 5 to 101 carbon atoms, and a curing agent.

This heat dissipating paint composition demonstrates a high heat dissipating property without requiring a heat dissipating filler. The side chain is flexible and can assume various conformations. Owing to the active molecular movements of the side chains including rotation and vibrations, it is believed that a high level of energy consumption by the side chain takes place, and the contact between the side chain and the external gas molecules and liquid molecules promotes removal of heat. As a result, the paint composition demonstrates a high level of heat dissipation. Since the epoxy resin in the main chain includes a hydroxyl group, the main chain can form a hydrogen bond with the oxide film formed on the surface of a metal member via the hydroxyl group. As a result, the bond between the metal surface and the heat dissipating paint composition can be improved.

Preferably, the prepolymer is represented by a following chemical formula (1), (1)

where R1 is epoxy resin, R2 is a linear chain compound containing 5 to 101 carbon atoms, and n is an integer of 1 to 1,000.

Thus, a prepolymer having a main chain and a side chain bonded thereto can be produced by using a chemical reaction between an amine and an epoxy resin.

Preferably, R2 includes an alkylene oxide copolymer.

Thereby, the bonding between the heat dissipating paint composition and the metal surface can be improved. Since the side chain contains O (ether bonded portion), the side chain can form a hydrogen bond with the oxide film on the metal surface via O. Thereby, the bonding between the metal surface and the heat dissipating paint composition can be improved.

Preferably, R2 contains a random copolymer of ethylene oxide and propylene oxide. Alternatively, R2 may contain a random copolymer of 19 ethylene oxides and 3 propylene oxides.

Preferably, R1 is a glycidyl ether type epoxy resin.

In this case, the prepolymer may be as represented by a following chemical formula (2), (2)

where x is an integer of 0 to 50, y is an integer of 0 to 50, and x+y=2 to 50. l is an integer of 1 to 15, m is an integer of 1 to 15, and n is an integer of 1 to 1000. The sequence of ethylene oxide and propylene oxide is random.

The present invention further provides a method for producing a heat dissipating coating on a surface of a metal member, comprising a first step of preparing a heat dissipating paint composition comprising a prepolymer including a main chain containing an epoxy resin and a linear side chain bonded to the main chain and having 5 to 101 carbon atoms, and a curing agent, a second step of applying the heat dissipating paint composition on a surface of the metal member, and a third step of heating the metal member on which the heat dissipating paint composition is applied.

Thereby, a heat dissipating coating can be formed on the surface of a metal member in a highly simple manner.

The present invention thus provides a heat dissipating paint composition that does not require a heat dissipating filler, and a method for forming a heat dissipating coating containing the heat dissipating paint composition.

DESCRIPTION OF THE PREFERRED EMBODIMENT(S)

A preferred embodiment of the present invention is described in the following. (Heat Dissipating Paint Composition)

The heat dissipating paint composition according to an embodiment of the present invention is used for forming a heat dissipating coating on the surface of a metal member. The heat dissipating paint composition contains a prepolymer including a main chain containing an epoxy resin and a linear side chain bonded to the main chain and containing 5 to 101 carbon atoms, and a curing agent. The prepolymer is represented by the following chemical formula (1), (1)

where R1 is an epoxy resin. R2 is a linear chain compound containing 5 to 101 carbon atoms. N is an integer of 1 to 1,000. R2 is more preferably a linear chain compound containing 30 to 100 carbon atoms. Further, n is more preferably an integer of 1 to 100.

The epoxy resin of the composition represented by R1 in the chemical formula (1) is, for example, a glycidyl ether type epoxy resin.

The glycidyl ether type epoxy resin is, for example, a bisphenol type epoxy resin (such as an epoxy resin having a bis (hydroxyphenyl) C1-10 alkane structure such as a bisphenol A type, a bisphenol F type, and a bisphenol AD type epoxy resin, and a bisphenol S type epoxy resin), hydrogenated bisphenol A type epoxy resin, novolak type epoxy resin (such as an alkylphenol novolak type such as phenol novolak type, and nonylphenol novolak type, and cresol novolak type epoxy resin), and fluorene-containing epoxy resin (such as 9, 9-bis (glycidyloxyaryl) fluorene (such as 9,9-bis (4-glycidyloxyphenyl) fluorene, 9,9-bis (6-glycidyloxy-2-naphthyl) fluorene, 9,9-bis (5-glycidyloxy-1-naphthyl) fluorene, and 9,9-bis (glycidyloxy (poly) alkoxyaryl) fluorene (such as 9,9-bis (4-(2-glycidyloxyethoxy) phenyl) fluorene, 9,9-bis (6-(2-glycidyloxyethoxy)-2-naphthyl) fluorene, 9,9-bis (glycidyloxy (poly) C2-4-alkoxyaryl) fluorene) such as 9,9-bis (5-(2-glycidyloxyethoxy)-1-naphthyl) fluorine) can be used.

These epoxy resins can be used alone or in combination of two or more.

The epoxy resin may be a modified epoxy resin in order to improve physical properties (such as flexibility and the like) of the coating film. Examples of the modification methods include urethane modification, phenol modification, and amine modification.

Examples of linear chain compounds containing 5 to 101 carbon atoms therein which is represented by R2 in the chemical formula (1) include polyalkylene oxides and linear alkyl groups. The linear alkyl groups may have, for example, 4, 8 or 12 carbon atoms.

The polyalkylene oxides may include, for example, at least one selected from a group consisting of ethylene oxide, propylene oxide, butylene oxide, and hexene oxide. The polyalkylene oxides may be a random copolymer of ethylene oxide and propylene oxide. Further, the random copolymer of ethylene oxide and propylene oxide may be a copolymer of 1 to 30 ethylene oxides and 1 to 3 propylene oxides, and may be a copolymer of 19 ethylene oxides and 3 propylene oxides.

Examples of the linear alkyl groups include ethylene glycol, propylene glycol, 1,2-propanediol, 1,3-propanediol, 1,2-butanediol, 1,3-butanediol, 1,4-butanediol, 2,3-butanediol, 1,2-butanediol, 1,2-pentanediol, 1,5-pentanediol, 1,4-pentanediol, 2,3-pentanediol, 2,4-pentanediol, 2,3-dimethyltrimethylene glycol, 3-methyl-pentane-1,5-diol, 3-methyl-1,5-pentanediol, 3-methyl-4,5-pentanediol, 2,2,4-trimethyl-1,3-pentanediol, 1,6-hexanediol, 1,5-hexanediol, 1,4-hexanediol, 2,5 hexanediol, 1,2-dodecanediol, 1,2-octadecanediol, and the like.

The prepolymer may be, for example, a compound represented by the following chemical formula (2), (2)

where x is an integer of 0 to 50, y is an integer of 0 to 50, and x+y=2 to 50.1 is an integer of 1 to 15, m is an integer of 1 to 15, and n is an integer of 1 to 1,000. The sequence of ethylene oxide and propylene oxide may be random. The combination of x and y is preferably x=9 and y=1, x=3 and y=19, x=10 and y=31, x=29 and y=6, and the like.

Examples of the curing agents include amines (aliphatic polyamine, aromatic amine, modified amine (polyamine epoxy resin adduct, etc.)), polyamide resins, tertiary and secondary amines (piperidine, triethylenediamine, etc.), imidazoles (2-methyl imidazole, 2-methyl-4-methyl imidazole, etc.), polymercaptan, polysulfide, acid anhydrides (aliphatic carboxylic acid anhydride, alicyclic carboxylic acid anhydride, etc.), phenol resin and the like.

The prepolymer of the heat dissipating paint composition is a resin that is soluble in an organic solvent such as alcohol and acetone. By mixing and heating the prepolymer and the curing agent, the epoxy groups of the prepolymer crosslink with each other to form a three-dimensional network structure. Optionally, another epoxy resin may be added to the prepolymer before adding the curing agent and heating the mixture. In this case, the epoxy groups of the prepolymer and the other epoxy resin crosslink with each other. In other words, the heat dissipating paint composition may contain another epoxy resin in addition to the prepolymer represented by the chemical formula (1). The other epoxy resin may be, for example, the same as the epoxy resin applicable to R1 in the chemical formula (1) described above. Further, the concentration of the prepolymer is preferably 5 wt % to 30 wt %, and the concentration of the curing agent is preferably 3 wt % to 10 wt %.

The solvent for the prepolymer is preferably a volatile organic solvent, for example, ketones such as acetone and methyl ethyl ketone, acetates such as methyl acetate, ethyl acetate and propyl acetate, hydrocarbons such as normal hexane, cyclohexane, methyl cyclohexane and normal heptane, aromatic hydrocarbons such as toluene, xylene and benzene, and ethers such as butyl cellosolve, phenyl cellosolve and dimethyl cellosolve.

In addition to the epoxy resin and the modified epoxy resin, other resins may be added to the mixture in order to improve the physical properties (such as flexibility) of the coating film. For example, phenolic resins, terpene phenolic resins, xylene resins, toluene resins, ketone resins, coumarone resins, petroleum resins, dicyclopentadiene resins, and the like can be used.

The heat dissipating paint composition of the present invention may additionally contain a surface conditioner, a wetting agent, a dispersing agent, a thickener, an anti-settling agent, an anti-sagging (anti-dripping) agent, a matting agent, a leveling agent, a reaction catalyst, a light stabilizing agent, an ultraviolet absorber and the like, depending on the need. Commercially available products can be used for these components.

Heat Dissipating Coating

The heat dissipating coating is a film formed on the surface of the base member, and contains a reaction product of the prepolymer and the curing agent contained in the above-mentioned heat dissipating paint composition. The base member may be, for example, a heat exchanger housing, tubing, or a core. The heat exchanger may be, for example, an intercooler or a radiator for a vehicle. The base member is preferably a metal member formed from iron, aluminum, or an alloy thereof The thickness of the heat dissipating coating is preferably 5 μm to 50 μm.

The heat dissipating coating forms a hydrogen bond with an oxide film on the metal surface via a hydroxyl group contained in the epoxy resin constituting the main chain. In addition, the heat dissipating coating forms a hydrogen bond with an oxide film on the surface of the metal via O contained in the polyalkylene oxide in the side chain. Thus, the heat dissipating coating can be relatively firmly bonded to the base member which typically consists of a metal member.

The side chain of the prepolymer of the heat dissipating paint composition that forms the heat dissipating coating has a certain flexibility, and can assume various conformations. Therefore, the energy consumption in the side chain increases due to the molecular motion including the rotation and vibration of the side chain increases, and the contact between the side chain and external gas molecules and liquid molecules increases so that the heat dissipation of the heat dissipating coating is enhanced. The side chain is preferably a copolymer of an alkylene oxide having an oxygen atom that forms a hydrogen bond with the oxide film on the surface of the base member. Due to this hydrogen bonding, the bonding of the heat dissipating coating to the surface of the base member is improved.

Method for Forming Heat Dissipating Coating

The method for forming a heat dissipating coating on the surface of a metal member comprises a first step of preparing a mixture (a heat dissipating paint composition) containing a prepolymer including a main chain containing an epoxy resin and a linear side chain bonded to the main chain and having 5 to 101 carbon atoms, and a curing agent, a second step of applying the mixture on a surface of the metal member, and a third step of heating the metal member on which the mixture is applied. In the third step, the prepolymer reacts with the curing agent on the surface of the base member to solidify, and the solvent evaporates. As a result, a heat dissipating coating is formed on the surface of the base member. In the first step, optionally, another epoxy resin may be mixed in addition to the prepolymer and the curing agent.

EXAMPLE

In the prepolymer of this example, R1 was a bisphenol A type epoxy resin and R2 was a random copolymer of 19 ethylene oxides and 3 of propylene oxides in the chemical formula (1). In other words, in the compound represented by the chemical formula (2), x was 3, and y was 19. The curing agent consisted of a polyamide-based curing agent. A mixture was prepared by diluting the prepolymer and the curing agent with butyl cellosolve so that the concentration of the prepolymer was 8 wt % and the concentration of the curing agent was 4 wt %. The base member consisted of an aluminum plate (A1050, length 150 mm×width 70 mm×thickness 0.8 mm). The mixture was applied to one surface of the base member by spraying an appropriate amount of the mixture by air spray. Subsequently, using a heating oven, the base member on which the mixture was applied was heated at 100° C. for 15 minutes. By the heating, the epoxy groups of the prepolymer were cross-linked to each other and cured on the surface of the base member while the butyl cellosolve evaporated. As a result, a heat dissipating coating was formed on the surface of the base member. The thickness of the heat dissipating coating given here was as measured after heating. The thickness of the heat dissipating coating can be adjusted by the spray amount of the heat dissipating paint by air spray. The sample thus formed is referred to as Sample of Example.

Heat Dissipation Performance Test

Figure 1:
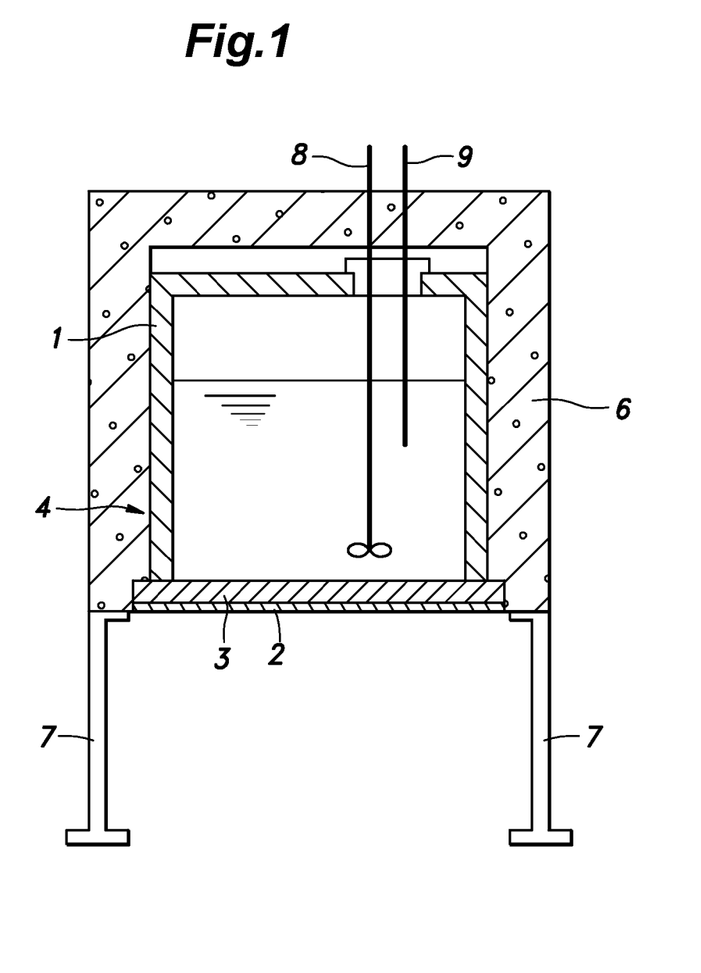
FIG. 1 schematically shows a container for performing a heat dissipating test.

The heat dissipating property of the heat dissipating coating was evaluated by the following heat dissipation performance test. As shown in FIG. 1, a test sample container 4 was prepared by cutting off the bottom of a rectangular steel can 1 (length 130 mm×width 50 mm×height 100 mm, thickness 0.8 mm), and closing the open bottom with a base member 3 on which a heat dissipating coating 2 is formed. The base member 3 was arranged so that the surface on which the heat dissipating coating 2 was formed faced downward (outward). The steel can 1 and the base member 3 were bonded in a liquid-tight manner with an adhesive. The upper and side portions of the test sample container 4 were covered with a styrene foam 6 (heat insulating material) having a thickness of 30 mm. The test sample container 4 was placed on the table 7 via the polystyrene foam 6 so that the base member 3 was placed at a position sufficiently separated from other structures. A liquid inlet is formed in an upper part of the test sample container 4. 350 mL of engine oil heated to 100° C. was charged into the test sample container 4 at the start of the test. The charged engine oil was stirred at 200 rpm by using a stirring rod 8 provided inside the test sample container 4. A thermocouple 9 for measuring the temperature of the engine oil is provided inside the test sample container 4. Further, a thermocouple (not shown) for measuring the outside air temperature was provided outside the measuring fixture (outside the polystyrene foam). The measurement was performed in an environment where the outside air temperature was room temperature (about 22° C.). When the temperature of the charged engine oil which was initially 100° C. dropped to 85° C., the time was set to 0. The subsequent decrease in the temperature of the engine oil was measured and recorded. Further, as a reference test, a similar heat dissipating performance test (temperature measurement) was performed using a test sample container having a base member having no heat dissipating coating on the bottom.

Figure 2:
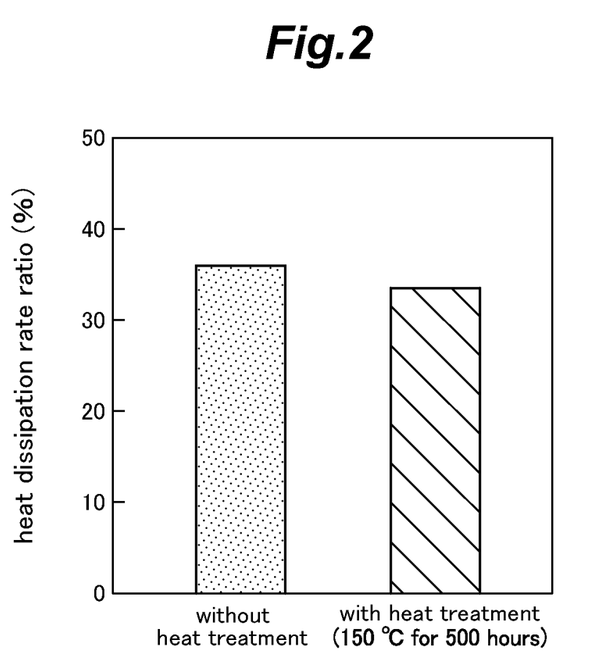
FIG. 2 is a graph showing a result of a heat resistance test performed on a heat dissipating coating.

In this test, the thickness of the heat dissipating coating of Sample of Example was set to 20 to 30 μm. The temperature of the engine oil decreased with time essentially due to heat dissipation through the base member. It was found that the decrease rate of the temperature Ts of the engine oil was significant when the base member on the bottom had a heat dissipating coating, as compared to the case where the base member did not have a heat dissipating coating (reference test). The amount of change in the natural logarithm of the difference between the engine oil temperature Ts and the outside air temperature Ta, or ln (Ts−Ta) per unit time (1 second) was defined as a heat dissipation rate Vs. As opposed to the heat dissipation rate Vs in the case where the base member has a heat dissipating coating, the corresponding heat dissipation rate in the case where the base member does not have a heat dissipating coating is referred to as a reference heat dissipation rate Vr. Further, the ratio of the heat dissipation rate Vs to the reference heat dissipation rate Vr is defined as a heat dissipation rate ratio R (=(Vs−Vr)/Vr×100). As shown in FIG. 2, in Sample of Example, the heat dissipation rate ratio was about 36%. Thus, it can be seen that the heat dissipation rate was significantly higher in the case where the heat dissipating coating of the present invention was applied than in the case where the heat dissipating coating of the present invention was not applied. Thus, the heat dissipating coating according to the embodiment of the present invention can improve the heat dissipating performance of the base member even though a heat dissipating filler is not used.

Heat Resistance Test of Heat Dissipating Coating

A heat resistance test was performed on the heat dissipating coating. In the heat resistance test, two samples were prepared. The first sample was prepared as described in Example (without heat treatment). The second sample was also prepared as described in Example, but was heated to 150° C. for 500 hours, and cooled at about 22° C. thereafter (with heat treatment). The heat dissipation performance test described above was performed for each sample, and the heat dissipation rate ratio of each sample was measured. FIG. 2 shows the results of the heat resistance test of the heat dissipating coating. From the graph of FIG. 2, it can be seen that the heat dissipation rate ratio of the first sample (without heat treatment) was 36%, whereas the heat dissipation rate ratio of the second sample (without heat treatment) was 35%. From this result, it can be concluded that that the heat dissipation performance of the heat dissipating coating according to the present embodiment did not substantially deteriorate due to the heat treatment. It can be surmised that O atoms in the main chain and the side chain have hydrogen-bonded to the oxide film on the surface of the base member such as aluminum.

Durability Test of Heat Dissipating Coating Against Heat, Water and Humidity

In order to evaluate the influence of the presence or absence of the side chain on the durability of the heat dissipating coating, a Sample for Comparison was prepared using a prepolymer which is similar to the prepolymer of Example, but R2 in Formula (1) was replaced by H. Sample of Example and Sample for Comparison are otherwise identical in chemical composition.

In a first heat resistance test, Sample of Example and Sample for Comparison were heated at 150° C. for 240 hours, and then left to cool at room temperature (about 22° C.). In a second heat resistance test, the heating time period was extended. Sample of Example and Sample for Comparison were heated at 150° C. for 500 hours, and then left to cool at room temperature (about 22° C.). In a water resistance test, Sample of Example and Sample for Comparison were immersed in water at 50° C. for 240 hours, and then left to cool at room temperature (about 22° C.). In a humidity resistance test, Sample of Example and Sample for Comparison were heated at 50° C. in a 95% humidity condition for 240 hours, and then left to cool at room temperature (about 22° C.).

At the end of each of these tests, the samples were subjected to a coating resistance test based on a cross-cut method prescribed in JIS K5600-5-6-1999. In the cross-cut method, The coating on each sample is cut into ten by ten (100) regions in a grid pattern each measuring 1 mm×1 mm by using a cutter knife, and an adhesive tape was attached to the surface of the coating. Then, the adhesive tape was peeled off from the surface of the coating, and the number of regions having the coating still remaining thereon was counted. The ratio of the regions having the intact coating to the entire regions is defined as a remaining area ratio (%). The greater the remaining area ratio is, the more durable the coating is or the higher the bonding between the coating and the base member is.

Figure 3:
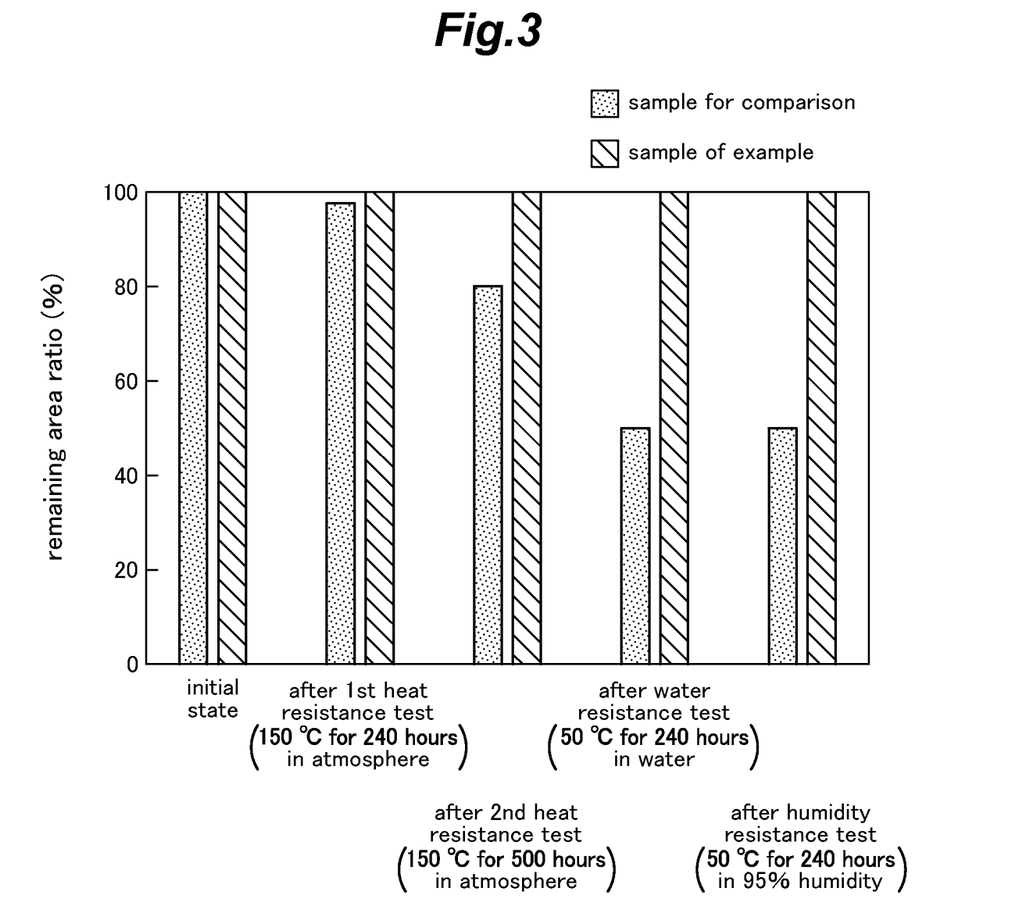
FIG. 3 is a graph showing a result of a durability test performed on a heat dissipating coating.

FIG. 3 is a graph showing the durability test results of Sample of Example and Sample for Comparison. In Sample of Example, the remaining area ratio was 100% after any of the first and second heat resistance tests, the water resistance test, and the humidity resistance test, and no peeling of the heat dissipation coating was observed. On the other hand, in Sample for Comparison, a decrease in the remaining area ratio was observed after any of the first and second heat resistance tests, the water resistance test, and the humidity resistance test. In particular, the remaining area ratio was 50% in Sample for Comparison that was subjected to the water resistance test and the humidity resistance test. From the results of these tests, it can be concluded that the durability of the heat dissipating coating formed from the prepolymer having a side chain including 19 ethylene oxides and 3 propylene oxides is high. The favorable result was achieved presumably owing to the fact that O contained in the side chain forms a hydrogen bond with the oxide film on the surface of the base member.

The present invention has been described in terms of a specific embodiment, but is not limited by such an embodiment, can be modified in various ways without departing from the scope of the present invention.

The invention claimed is:

1. A heat dissipating paint composition for forming a heat dissipating coating, comprising:
    a prepolymer including a main chain containing an epoxy resin and a linear side chain bonded to the main chain and having 5 to 101 carbon atoms; and
    a curing agent,
    wherein the prepolymer is represented by a following chemical formula (1), where R1 is epoxy resin, R2 is a linear chain functional group containing 5 to 101 carbon atoms, and n is an integer of 1 to 1,000.

2. The heat dissipating paint composition according to claim 1, wherein R2 includes an alkylene oxide copolymer.

3. The heat dissipating paint composition according to claim 2, wherein R2 includes a random copolymer of ethylene oxide and propylene oxide.

4. The heat dissipating paint composition according to claim 3, wherein R2 contains a random copolymer of 19 ethylene oxides and 3 propylene oxides.

5. The heat dissipating paint composition according to claim 1, wherein R1 is a glycidyl ether type epoxy resin.

6. A heat dissipating paint composition for forming a heat dissipating coating, comprising:
    a prepolymer including a main chain containing an epoxy resin and a linear side chain bonded to the main chain and having 5 to 101 carbon atoms; and
    a curing agent,
    wherein the prepolymer is represented by a following chemical formula (2), where x is an integer of 0 to 50, y is an integer of 0 to 50, x+y=2 to 50, I is an integer of 1 to 15, m is an integer of 1 to 15, and n is an integer of 1 to 1000, wherein ethylene oxides and propylene oxides are in random sequence.

\* \* \* \* \*